United States Patent [19]
Korus

[11] Patent Number: 5,695,129
[45] Date of Patent: Dec. 9, 1997

[54] FLEXIBLE JOINT FOR IRRIGATION MACHINE WITH STEERABLE CORNER SPAN

[75] Inventor: Thomas J. Korus, Lindsay, Nebr.

[73] Assignee: Lindsay Manufacturing Company, Lindsay, Nebr.

[21] Appl. No.: 503,161

[22] Filed: Jul. 17, 1995

[51] Int. Cl.⁶ .................................................. B05B 3/12
[52] U.S. Cl. ........................ 239/729; 239/732; 239/730
[58] Field of Search ............................ 239/722, 723, 239/726, 728–730, 732

[56] References Cited

U.S. PATENT DOCUMENTS

| | | | |
|---|---|---|---|
| 3,902,668 | 9/1975 | Daugherty et al. | 239/729 |
| 3,979,062 | 9/1976 | Christensen et al. | 239/729 X |
| 4,432,494 | 2/1984 | Hunter | 239/729 |
| 4,569,481 | 2/1986 | Davis et al. | 239/729 |
| 4,674,681 | 6/1987 | Meis et al. | 239/729 X |

*Primary Examiner*—Lesley D. Morris
*Attorney, Agent, or Firm*—Dorn, McEachran, Jambor & Keating

[57] ABSTRACT

A flexible joint accommodates relative horizontal motion between the main pipeline of a center pivot irrigation machine and a swing span without unduly stressing the spans. The flexible joint has a spindle mounted for rotation about a vertical axis in a socket at the outer end of the main pipeline section. The spindle has a horizontal pivot shaft mounting an arm assembly for rotation about the shaft. The opposite end of the arm assembly carries a second pivot shaft pivotally mounting a link. The swing span is attached to the link. A brake is provided to limit coasting of the swing span.

18 Claims, 5 Drawing Sheets

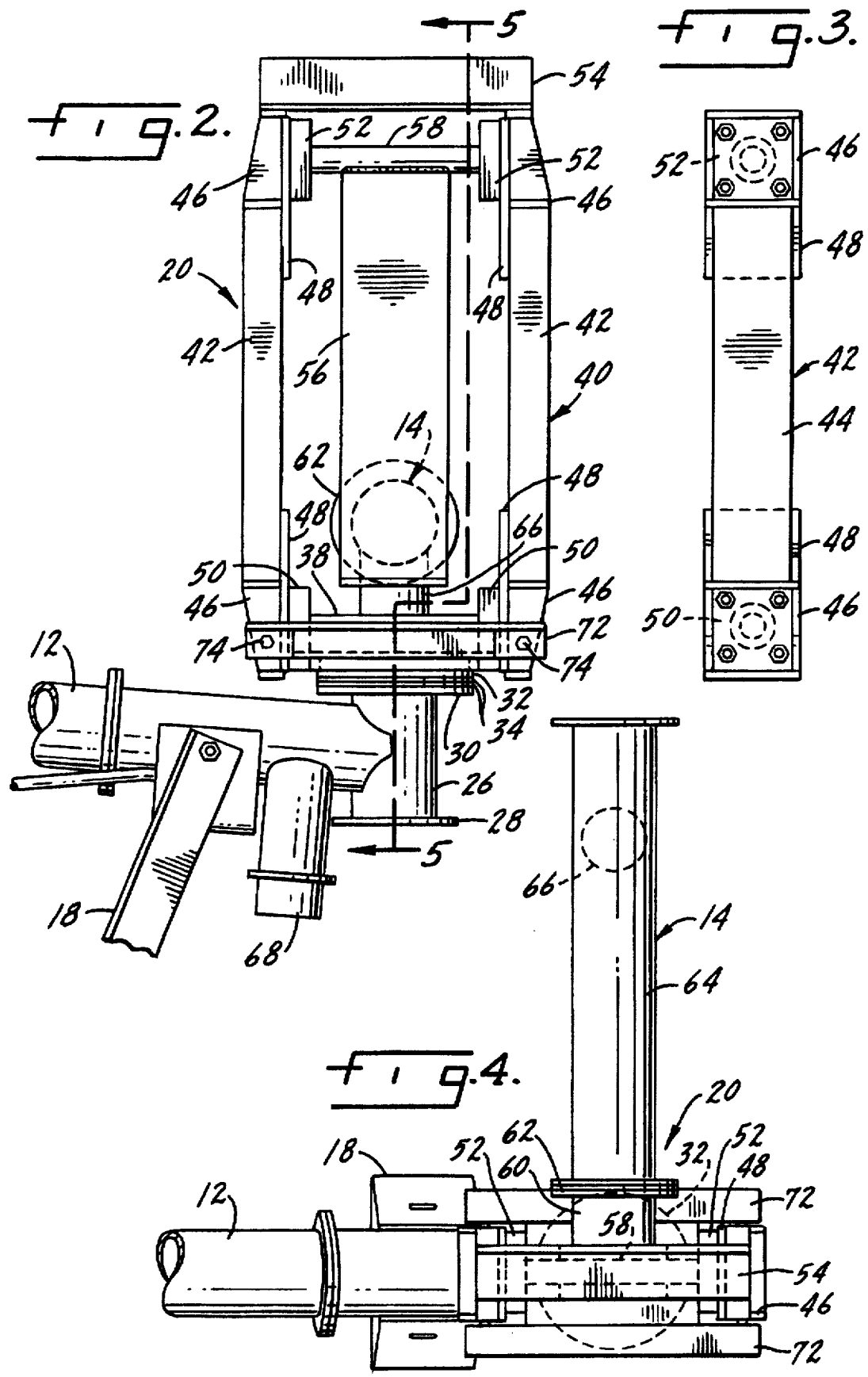

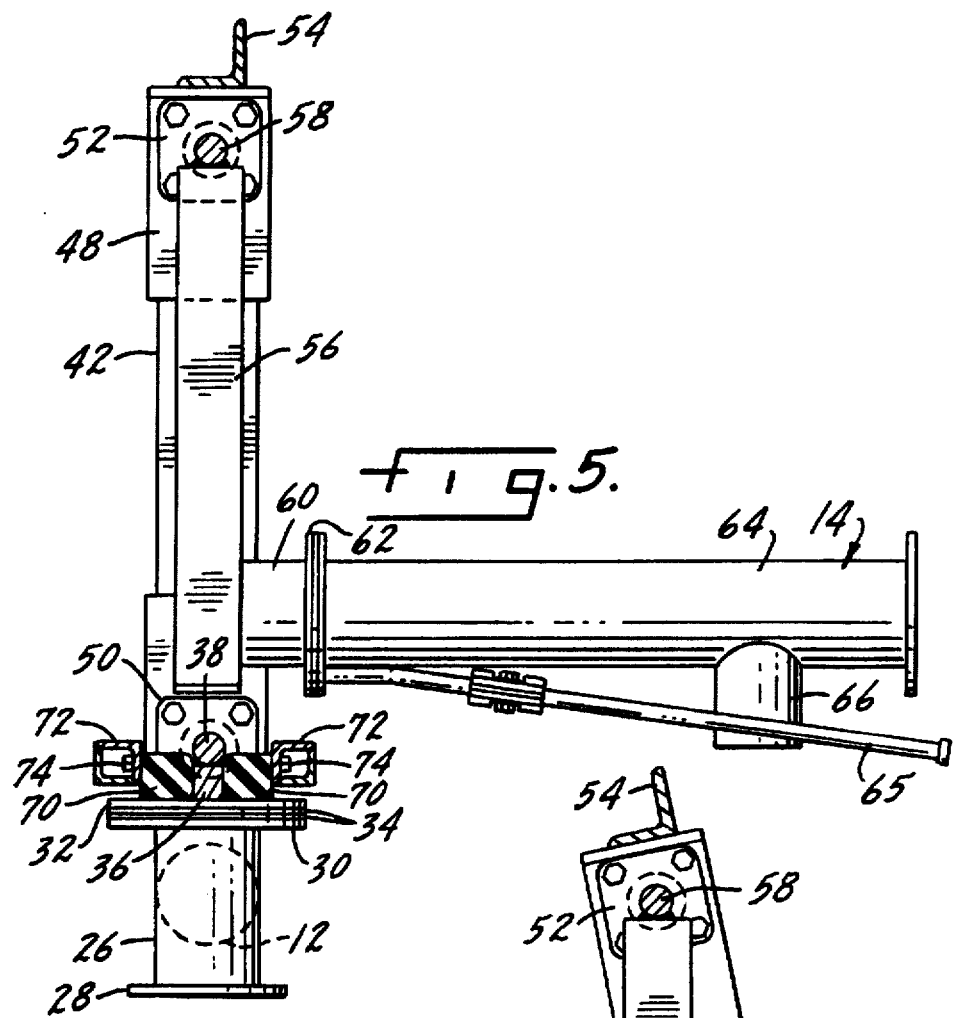
fig. 5.
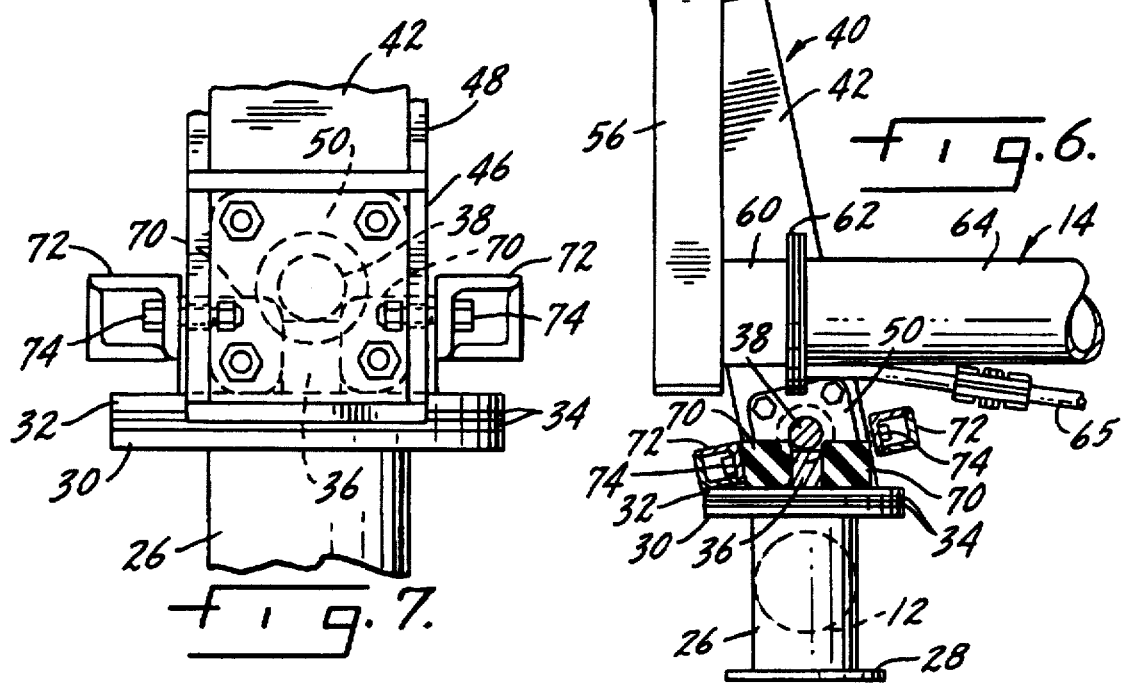
fig. 6.
fig. 7.

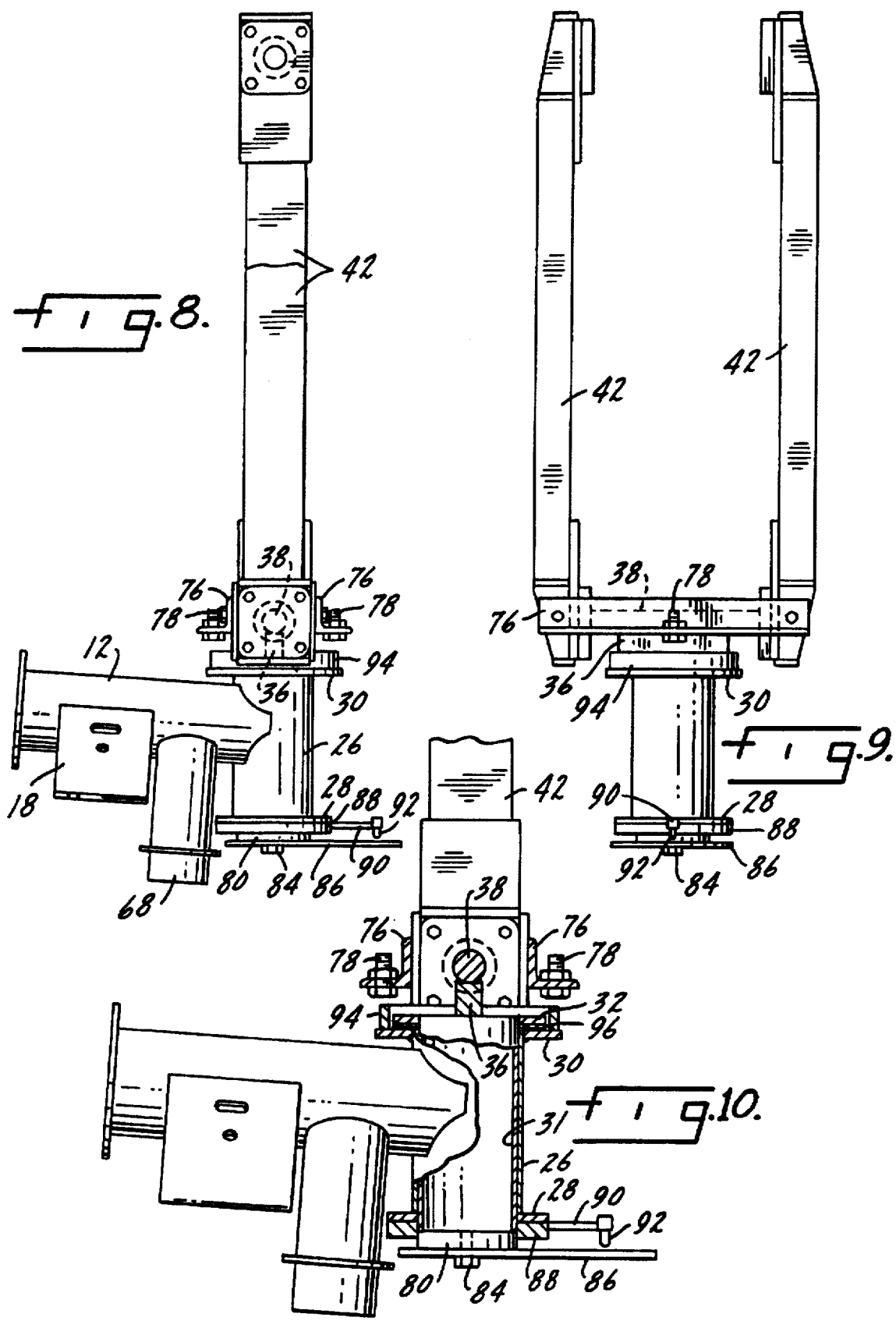

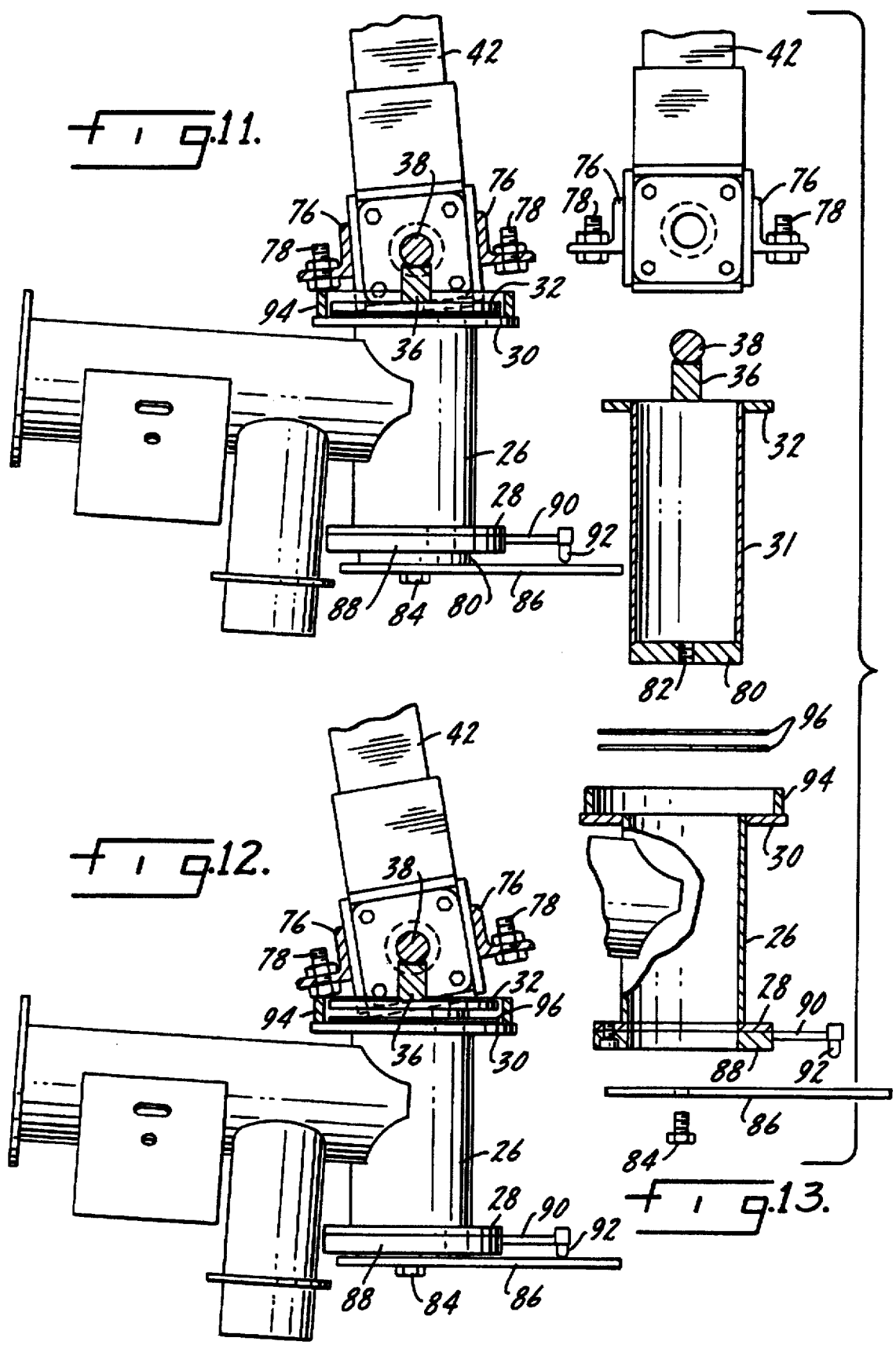

5,695,129

1

FLEXIBLE JOINT FOR IRRIGATION MACHINE WITH STEERABLE CORNER SPAN

BACKGROUND OF THE INVENTION

Agricultural irrigation machines of the type known as center pivot machines have a main pipeline section supported at intervals on movable towers for rotation about an inner end of the pipeline. Water is supplied to the fixed, inner end of the pipeline and distributed through sprinklers placed along the pipeline. The movement of the main pipeline section about its central pivot point irrigates a circular portion of a field. This leaves the corners of square or rectangular fields without irrigation. In installations where the additional productive capacity of a field's corners warrants, the corners can be irrigated by adding a swing span to the outer end of the main pipeline for irrigating areas of the field outside of the circular area. The swing span pivots about the outer end of the main pipeline section as needed to extend into the corners while also moving to keep up with the main pipeline section's rotation about the center pivot.

A commonly-used control scheme for center pivot units causes the outermost tower on the main pipeline section to advance independently at a user-defined speed. All inboard towers advance as needed to keep the main pipeline straight. The swing span is pivotally connected to the outer end of the main pipeline and supported on a steerable tower. The steerable tower travels outside of the main circle, following its own guide path. That path may be defined by various means, such as a buried cable. The guide path for the steerable tower extends at least partially into the corners of the fields, thereby causing the steerable tower to move the swing span out into a corner when the main pipeline is opposite of a corner. When the main pipeline is adjacent the side of a field the steerable tower usually lags behind the main pipeline, thereby folding the swing span back in to a trailing position behind the main pipeline. A mechanical sensor at the junction of the main pipeline and swing span activates the steerable tower as needed to effect the desired movement.

While the sensor is designed to start and stop the steerable tower to keep its movement synchronized with that of the end tower, there is an inherent delay in translating a mechanical start/stop signal for the steerable tower into actual effectuation of the command. That is, electrical switches, contactors, and motors cannot react instantaneously to a mechanical signal to start or stop, it takes some time. Also, field conditions, such as inclines, ruts and the like, sometimes cause a tower to continue moving after its drive motor has shut off. This is known as coasting. Whatever the cause, the steerable tower has a natural tendency to get slightly ahead of or behind the location that would result in "perfect" orientation between the swing span and main pipeline for a given location in the field. Thus, the movements of the main pipeline and swing span generate relative horizontal movement between them and some accommodation must be made for the relative horizontal movement to avoid overstressing the pipeline spans. An example of a flexible joint used for this purpose in the past is shown in U.S. Pat. No. 4,674,681. The unit described in this patent has proven to be a serviceable design while the present invention offers improvements in terms of cost and wear resistance.

SUMMARY OF THE INVENTION

The present invention relates to agricultural irrigation machines of the type having a center pivot unit with corner watering ability provided by a swing span supported by a steerable tower. It is particularly concerned with a flexible joint for connecting the swing span to the main pipeline section of the center pivot. The flexible joint is somewhat in the nature of a pendulum for accommodating horizontal motion between the swing span and the main pipeline.

The flexible joint includes a spindle mounted for rotation about a vertical axis at or near the end of the center pivot. The spindle has a horizontal pivot shaft defining an axis about which an arm assembly is pivotally mounted. The arm assembly has bearings which mount a second pivot shaft to which a link member is attached. The swing span is connected to the link member. Accordingly, the arm assembly pivots on the spindle and the link pivots on the arm assembly, allowing relative horizontal movement between the swing span and main pipeline.

The flexible joint also incorporates a brake to limit coasting. The brake includes an elastomeric pad attached to the spindle where it is compressible by a bumper attached to the arm assembly. Rotation of the arm assembly carries the bumper into contact with the brake pad. The pad is stiff enough to retard coasting but flexible enough to permit arm rotation to a safety shutdown limit switch in the event of a serious malfunction.

BRIEF DESCRIPTION OF THE DRAWINGS

FIG. 2 is a side elevation view of the flexible joint of the present invention, With the swing span shown in a folded or tucked position wherein it is perpendicular to the main pipeline section. As used herein "side" and "end" views are relative to the main pipeline section. Thus, in FIG. 2 the main pipeline section runs from left to right across the Figure and the line of sight is perpendicular to the main pipeline.

FIG. 3 is an end elevation view of an elongated member of the arm assembly of FIG. 2.

FIG. 4 is a top plan view of the flexible joint.

FIG. 5 is a section taken along line 5—5 of FIG. 2.

FIG. 6 is an end elevation view of the flexible joint, with the joint shown in a flexed position.

FIG. 7 is an enlarged, end elevation illustrating details of the brake.

FIG. 8 is a side elevation view of an alternate embodiment of the flexible joint of the present invention, with the swing span shown in a fully extended position wherein it is parallel to the main pipeline section. This fully extended position is for purposes of illustration only; the swing span would never actually be parallel to the main pipeline.

FIG. 9 is an end elevation view of the arm assembly and spindle of the joint of FIG. 8.

FIG. 10 is a view similar to FIG. 8, with parts broken away to show section lines and the arm assembly in a neutral position.

FIG. 11 is similar to FIG. 10, showing the brake engaged.

FIG. 12 is similar to FIG. 10, showing the emergency shutdown switch engaged.

FIG. 13 is an exploded view of the socket, spindle and arm assembly of the joint of FIG. 8.

DETAILED DESCRIPTION OF THE INVENTION

Figure 1:
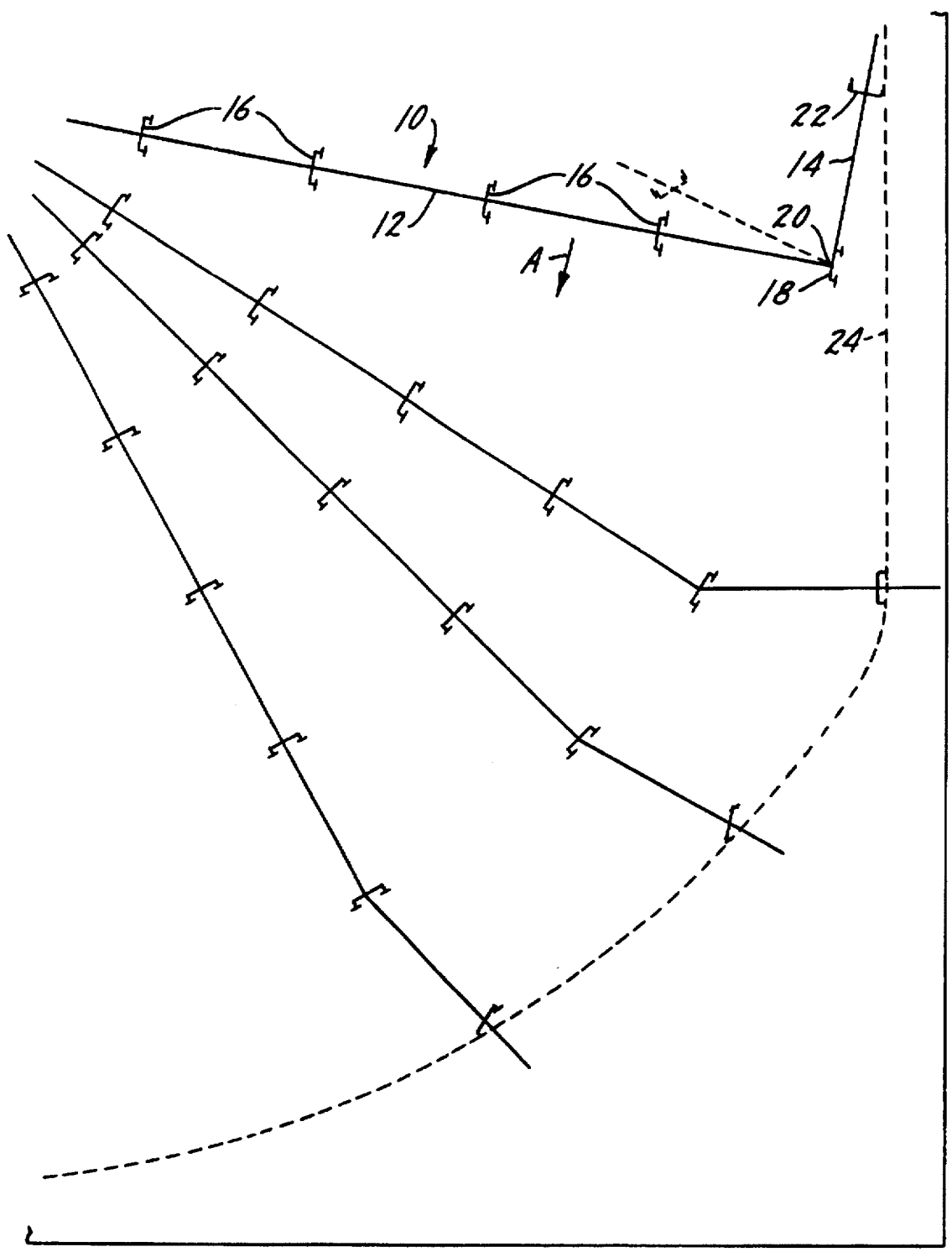
FIG. 1 is a diagrammatic plan view of a center pivot irrigation machine equipped with a swing span, showing the machine in successive positions during a clockwise rotation.

A center pivot irrigation machine is shown generally at 10 in FIG. 1. The machine has a pipeline including a main section 12 and a swing span 14. The main section 12 is supported at intervals by movable towers 16 and a movable end tower 18. The swing span 14 is connected at its inner end by a flexible connecting joint 20 to the outer end of the main section 12. The outer portion of the swing span is supported on a movable tower 22 having steerable wheels. All of the towers have a drive such as an electric motor for causing the towers to carry the pipeline around a field. The main section of the pipeline rotates around a center pivot point at its inner end. Water is supplied by a pump to the pipeline at the pivot point for distribution by sprinklers spaced along the main section and swing span.

As the center pivot machine rotates in the direction of arrow A, it can be seen that the main pipeline section 12 irrigates a circular area. In a rectangular field the main section would leave the corners of the field without irrigation. Thus, the swing span 14 is controlled to swing out or extend into the corners of a field to allow irrigation of those portions of the field beyond the circular area. When the center pivot main section is opposite a side of a field, the swing span is folded or tucked in a trailing position and its sprinklers are turned off, so that the swing span does not extend beyond the boundaries of the field. It can be seen that the steerable tower 22 must be controlled to cause the swing span 14 not only to keep up with the main pipeline section 12 but also to swing in and out of the corner areas. This is done by making the steerable tower 22 follow a guide path or reference line shown in dotted lines at 24. The guide line 24 may be defined by a buried cable or other suitable means. The described movements of the swing span and main section create relative horizontal movement between them. The flexible connecting joint 20 must accommodate these movements to prevent undue stress on the spans of the pipeline.

FIGS. 2–6 illustrate the flexible connecting joint 20 of the present invention. The joint is mounted at or near the end of the main pipeline section. By at or near it is meant that the joint is in the vicinity of the end tower 18. The joint does not have to be exactly at the ultimate end of the pipeline 12, although in the preferred embodiment shown, this is the case. For that matter the joint does not even have to be on the pipeline itself, it could be mounted on the end tower.

The joint 20 includes a cylindrical sleeve 26 fixed to the end of the main pipeline section 12. The sleeve defines a vertical axis. A bottom flange 28 surrounds the bottom of the sleeve 26 while a top flange 30 has an opening providing access to the interior of the sleeve. Flanges 28 and 30 are welded to the sleeve 26. Together the sleeve 26 and flanges 28 and 30 comprise a socket for receiving a spindle. The spindle has a cylindrical tube (shown at 31 in FIG. 13) that fits snugly inside the sleeve 26 with enough clearance to allow the spindle to rotate about the vertical axis of the sleeve 26. The tube 31 has a circular spindle flange 32 attached to the top of it. The flange 32 rests on the flange 30, separated by two wear pads 34. The spindle can rotate about the vertical axis of the socket.

Mounted on top of the spindle flange 32 is a spacer block 36 and a first pivot shaft 38. Spacer block 36 is preferably welded to the spindle flange 32 and the shaft 38 is welded to the block. The pivot shaft 38 defines a horizontal axis and extends beyond the ends of the spacer block for mounting of an arm assembly indicated generally at 40.

The arm assembly 40 includes two elongated members 42, one mounted on each end of the first pivot shaft 38. Details of the elongated members 42 are shown in FIG. 3. Each member has a central body portion 44 which is a box section, i.e. it is rectangular with a hollow center. At each end of the body portion there is a five-sided enclosure 46 which is open to the outside. Each end of the body portion on its inside surface has a bearing pad 48 which spans both the enclosure 46 and a length of the central portion 44. Lower bearings 50 are attached to the pad 48 while upper bearings 52 are similarly connected at the top ends of the elongated members. The bearings are sealed, spherical roller bearings in a housing. These four bearings are the only moving mechanical parts of the design. The lower bearings 50 are mounted on the ends of the pivot shaft 38 for rotation of the arm assembly about the horizontal axis defined by the lower or first pivot shaft 38. The tops of the elongated members 42 are connected by a cross-member 54 which is shown as an angle iron in this embodiment. Together the elongated members 42 and cross-member 54 give the arm assembly a two-pronged fork-like configuration as best seen in FIG. 2.

A link shown generally at 56 has an elongated box section with a second pivot shaft 58 welded to its upper end. The pivot shaft 58 is mounted for rotation in the upper bearings 52. A short tube 60 is welded to the lower end of the link, extending at 90° to the elongated box section and terminating at a flange 62. This flange joins a similar one on the end of a span extension tube 64. Extension 64 has a water inlet 66 to which a flexible water supply hose (not shown) can be connected. The other end of the supply hose joins a water outlet 68 which is in communication with the main pipeline section 12. The flexible water supply hose provides fluid communication between the main pipeline and the swing span extension tube. It will be understood that extension tube 64 is connected to a much longer pipeline section for the swing span. The extension tube may also provide an anchor for swing span truss rods such as at 65.

A brake for dampening coasting is best seen in FIGS. 6 and 7. The brake includes a pair of flexible pads or blocks 70. There is a block on each side of the spacer 36, resting on top of the spindle flange 32. The pads 70 are preferably made of elastomeric material such as urethane. A pair of bumpers 72 are loosely bolted as at 74 to the elongated members 42 of the arm assembly. When the arm assembly rotates sufficiently, as shown in FIG. 6, one of the bumpers 72 will compress the brake pad 70, thereby tending to retard motion of the arm assembly and link. The pads are loose and just sit on the spindle flange 32, trapped between the spacer 36 and bumpers 72.

The swinging or linear motion of the swing span is controlled by a mechanical link to a control box (not shown) on the end tower with microswitches to control the start-stop of both towers. In the same control box, there is a safety switch to open the circuit and shut the system off should one of the towers not move when told to. This could be caused by a flat tire, drive line failure to gear boxes or drive shaft connectors, getting stuck and the like. Without a safety switch, there could be damage to the towers, span, etc. The bumpers are set so that during normal operation they are not compressing the brake pads. Tower coasting and sliding are normal during operation. The bumpers are there to prevent a nuisance shutdown because of coasting. Under coasting, which is unpowered tower movement of either the end tower or steerable tower, the bumper pads will be stiff enough to hold the movement and not allow the swing span to travel into the safety switch. Yet when one of the towers is under power, the bumper resistance is such that it can be overcome and reach the safety if that becomes necessary. Again, during normal running the bumper pads are not being compressed. In a non-powered situation where there is coasting or sliding, the bumpers slide up against the brake pads and movement stops. When one tower is under power the brake pads can be compressed and then driven completely through to the safety position if conditions warrant.

The use, operation and function of the invention are as follows. When the movements of the swing span and main pipeline section result in relative horizontal movement between the two spans, the link 56 will pivot about shaft 58 in bearings 52. As the relative horizontal movement continues, the link will tend to cause rotation of the arm assembly 40 about pivot shaft 38 in lower bearings 50. Electromechanical switches in the end tower control box (not shown) will activate the steerable tower 22 as needed to keep the swing span in the proper relative orientation to the main pipeline section 12. During the operation of the system, there are times when both the main pipeline and swing span are moving at the same time. Usually, however, after some time the two towers move either side of the center of total travel and one will stop for the other to catch up. This will cause relative horizontal movement in one direction or the other as the swing span normally slightly overtakes or gets behind the main pipeline section. Thus, it can be seen that the arm assembly 40 and link 56 will tend to rock back and forth, somewhat in the nature of a pendulum. While the motion of the arm assembly and link is, strictly speaking, arcuate, most of the motion will be in the horizontal direction. The joint or flexible connection shown will provide about a total of twenty inches of linear travel. This amount is sufficient to accommodate the expected variations in horizontal positions of the swing span and main pipeline section. Rotational motion about a vertical axis is accommodated by rotation of the spindle in the socket formed by sleeve 26.

Turning now to the alternate embodiment of FIGS. 8–13, equivalent or nearly equivalent elements will be given the same reference numerals as above and their description will not be repeated. This embodiment features a different brake which requires some alteration in each of the arm assembly 40, the spindle and the socket. In the arm assembly the flexible pads 70 and bumpers 72 are replaced by a pair of crossbeams 76. The crossbeams as shown are angle irons which have a vertical portion bolted to the elongated members 42 of the arm assembly 40. The horizontal portion of the crossbeams carry a foot 78. The foot is a nut and bolt combination which is adjustably mounted in the center of the crossbeams 76.

The spindle has a bottom plate 80 attached to the cylindrical tube 31. The tube 31 is long enough to allow the bottom plate 80 to protrude from the bottom of the sleeve 26. The plate has the same outside diameter as the tube so the tube rotates freely inside the sleeve 26. For reference purposes only, the inside diameter of the sleeve 26 may be about 6.125" while the outside diameter of the tube 31 is about 6.0". There is a threaded bore 82 at the center of the plate 80. The bore 82 receives a bolt 84 which connects a cam plate 86 to the bottom plate. The cam plate is attached after the spindle has been inserted into the sleeve 26 so the cam plate 86 is disposed beneath the sleeve. The cam plate, of course, will rotate in the socket with the spindle. The cam plate will also move up and down in the socket with the spindle, to the extent permitted by the gap between the cam plate and the bottom of the socket.

The bottom of the socket in this embodiment includes a safety switch mounting ring 88 bolted to flange 28. The mounting ring 88 has an inside diameter of about 6.020" which prevents the spindle from tilting or canting inside the sleeve 26. A safety switch is shown at 90 attached to the mounting ring 88. The switch has a plunger actuator that extends radially from the mounting ring 88. A finger 92 on the plunger faces but is normally spaced from the cam plate 86. On the upper end of the socket a ring 94 is attached to the top flange 30. The ring 94 has a large enough diameter to surround the spindle flange 32 and spacer block 36. The foot 78 is normally aligned with the ring 94 and spaced therefrom.

An arm and link are bolted to the bottom of the tube 31 to give a reading to a potentiometer panel. This potentiometer reading controls when the valves turn on and off and controls water patterns. A pair of plastic washers 96 are disposed between the top flange 30 of the socket and the spindle flange 32, inside the ring 94. These washers 96 replace the wear pads 34. They serve as a thrust bearing. Grease is applied between the two washers, allowing free rotation of the two surfaces.

The operation of the alternate embodiment is similar to that described above except for the brake. FIGS. 8–10 show the arm assembly in a vertical position in which the upper or second pivot shaft 58 is directly above the first pivot shaft 38. Note the gap between the feet 78 and the ring 94 and between the safety switch finger 92 and the cam plate 86. During normal operation the arms swing back and forth to give the swing span a travel of about 5 to 7 inches. When coasting occurs as described above, the swing span or end tower continue to move after the motors are stopped. This makes the arms continue to move until the foot 78 comes to rest on top of the ring 94. In FIG. 11 the arm assembly is shown in a position somewhat past the point that a run switch (not shown) should have stopped the tower motion and coasting has brought one foot 78 into contact with the ring 94. During normal coast the contact between the foot and ring will stop the coasting motion, since there is about 3,800 pounds of weight on the swing span pivoting end. There is still a gap between the finger 94 and cam plate 86 in the FIG. 11 position.

In the event of a malfunction, i.e., either the swing span tower or end tower of the main pipeline fails to move or stop moving, a safety shutdown is required. In such a situation the arm assembly continues to rotate past the position of FIG. 11 toward the position of FIG. 12. The spindle is pulled up out of the socket. This causes the cam plate to move upwardly, actuating the safety switch 90 which will cause the shutdown.

While a preferred form of the invention has been shown and described, it will be realized that alterations and modifications may be made thereto without departing from the scope of the following claims. For example, while a single, fixed pipeline segment is shown for the swing span, it could have multiple or even articulated pipeline sections, such as shown in the aforementioned U.S. Pat. No. 4,674,681. Also, it will be understood that the invention is not limited to the exact configuration of the illustrated arm assembly. While the arm assembly is shown pivoting about a horizontal axis and the spindle pivots about a vertical axis, the orientation of these axes could be other than as shown. One possibility would be to reverse the orientation of the axes. The illustrated use of twin elongated members in the arm assembly with an intermediate link is preferred but not required. A single member with an adjacent link could be used, or the link could be eliminated with the swing span connected directly to the arm.

I claim:

1. In an irrigation machine of the type having a pipeline with a plurality of sprinkler units mounted therealong, the pipeline including a main section with inner and outer ends and a swing span connected to and pivotable about the outer end of the main section, the main section being supported at intervals on self-propelled movable towers for rotation about a central pivot at the inner end to irrigate a circular area of a field in which the machine is operating, the swing span being supported at its outer end by a steerable tower which is controlled to follow a path at least partially outside the circular area such that the swing span is pivotable about the outer end of the main section between a tucked-in position trailing the pipeline and an extended position beyond the sweep of the main section to enable irrigation of areas of the field outside of the circular area, the improvement comprising a connecting joint between the swing span and outer end of the main section, comprising a spindle mounted for rotation about a vertical axis at or near the outer end of the pipeline, an arm pivotally connected to the spindle for rotation about a horizontal axis, the swing span being connected to said arm at a point vertically spaced from the horizontal axis such that rotation of the arm about the horizontal axis accommodates relative motion in a horizontal direction between the swing span and main section.

2. The connecting joint of claim 1 further comprising a link pivotally connected to said arm for rotation about a second horizontal axis which is spaced from the horizontal axis about which the arm rotates, the swing span being attached to the link.

3. The connecting joint of claim 1 further comprising a socket mounted at or near the outer end of the pipeline and having an opening therein for receiving the spindle.

4. The connecting joint of claim 1 wherein the spindle includes a shaft defining the horizontal axis, and the arm comprises an assembly of two elongated members each having a bearing mounted in one end thereof for mounting the elongated members on the spindle shaft, and a cross-member fixedly attached to the elongated members to maintain them in spaced relation.

5. The connecting joint of claim 4 further comprising second bearings mounted on each of the elongated members spaced from said bearing in one end thereof, a pivot shaft supported in said second bearings, and a link member connected to said pivot shaft for rotation thereabout, the swing span being attached to the link member.

6. The connecting joint of claim 1 further comprising brake means attached to the spindle for limiting rotation of the arm.

7. The connecting joint of claim 6 wherein the brake means comprises a flexible pad mounted on the spindle, and a bumper attached to the arm in a position where the bumper will compress the pad upon rotation of the arm beyond a selected point.

8. In an irrigation machine of the type having a pipeline with a plurality of sprinkler units mounted therealong, the pipeline including a main section with inner and outer ends and a swing span connected to and pivotable about the outer end of the main section, the main section being supported at intervals on self-propelled movable towers for rotation about a central pivot at the inner end to irrigate a circular area of a field in which the machine is operating, the swing span being supported at its outer end by a steerable tower which is controlled to follow a path at least partially outside the circular area such that the swing span is pivotable about the outer end of the pipeline between a tucked-in position trailing the pipeline and an extended position beyond the sweep of the main section to enable irrigation of areas of the field outside of the circular area, the improvement comprising a connecting joint between the swing span and outer end of the main section that accommodates relative motion in a horizontal direction between the swing span and main section, comprising pivot means mounted at or near the end of the main section and defining an axis, and an arm pivotally connected to the pivot means for rotation about said axis, the swing span being connected to said arm at a point vertically spaced from said axis such that horizontal motion between the main section and swing span results in rotation of the arm about the pivot means.

9. The connecting joint of claim 8 further comprising a link pivotally connected to said arm for rotation about a second horizontal axis which is spaced from the horizontal axis about which the arm rotates, the swing span being attached to the link.

10. The connecting joint of claim 8 wherein the pivot means comprises a spindle mounted for rotation about a vertical axis, and a socket mounted at or near the outer end of the pipeline and having an opening therein for receiving the spindle.

11. The connecting joint of claim 8 wherein the pivot means includes a shaft defining a horizontal axis, and the arm comprises an assembly of two elongated members each having a bearing mounted in one end thereof for mounting the elongated members on the pivot means shaft, and a cross-member fixedly attached to the elongated members to maintain them in spaced relation.

12. The connecting joint of claim 11 further comprising second bearings mounted on each of the elongated members spaced from said bearing in one end thereof, a second pivot shaft supported in said second bearings, and a link member connected to said second pivot shaft for rotation thereabout, the swing span being attached to the link member.

13. The connecting joint of claim 8 further comprising brake means attached to the pivot means for limiting rotation of the arm.

14. The connecting joint of claim 13 wherein the brake means comprises a flexible pad mounted on the pivot means, and a bumper attached to the arm in a position where the bumper will compress the pad upon rotation of the arm beyond a selected point.

15. In an irrigation machine of the type having a pipeline with a plurality of sprinkler units mounted therealong, the pipeline including a main section with inner and outer ends and a swing span connected to and pivotable about the outer end of the main section, the main section being supported at intervals on self-propelled movable towers for rotation about a central pivot at the inner end to irrigate a circular area of a field in which the machine is operating, the swing span being supported at its outer end by a steerable tower which is controlled to follow a path at least partially outside the circular area such that the swing span is pivotable about the outer end of the pipeline between a tucked-in position trailing the pipeline and an extended position beyond the sweep of the main section to enable irrigation areas of the field outside of the circular area, the improvement comprising a connecting joint between the swing span and outer end of the main section, comprising means for accommodating relative motion in a horizontal direction between the swing span and main section, and a brake for dampening coasting of the swing span and main section.

16. The connecting joint of claim 15 wherein said means for accommodating comprises a pendulum connection between the swing span and main section and the brake comprises a flexible brake pad located so as to dampen swinging of the pendulum.

17. The connecting joint of claim 15 wherein said means for accommodating comprises a pendulum connection between the swing span and main section, the pendulum connection including a spindle mounted in a socket on the end of the main section, and the brake comprises a foot connected to the pendulum connection, and a ring fixed to the socket, the foot being arranged to engage the ring upon coasting of the main section or swing span.

18. The collecting joint of claim 17 wherein the brake further includes safety shutdown means including a switch fixed to the socket, and a cam plate fixed to the spindle, the spindle being connected to the pendulum connection such that continued movement of the pendulum connection past a desired point causes the spindle to rise out of the socket, carrying the cam plate into engagement with the switch to shut down the irrigation machine.

* * * * *